Oct. 26, 1954
A. WINTHER
2,692,843
MAGNETIC LINING FOR CLUTCHES AND
BRAKES AND METHOD OF MAKING SAME
Filed April 22, 1950
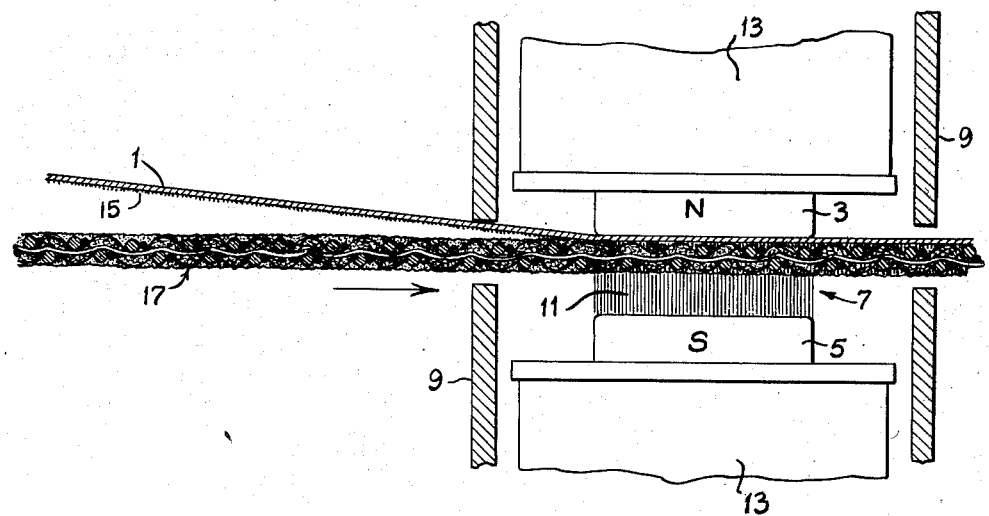
Anthony Winther,
Inventor.
Haynes and Koenig,
Attorneys.

Patented Oct. 26, 1954

2,692,843

UNITED STATES PATENT OFFICE 2,692,843

MAGNETIC LINING FOR CLUTCHES AND BRAKES AND METHOD OF MAKING SAME

Anthony Winther, Kenosha, Wis., assignor, by mesne assignments, to Eaton Manufacturing Company, Cleveland, Ohio, a corporation of Ohio Application April 22, 1950, Serial No. 157,536

6 Claims. (Cl. 154—81)

This invention relates to magnetic linings for magnetic clutches, brakes and the like.

The invention is an improvement upon the products, processes and apparatus disclosed in my United States patent application Serial No. 91,792, filed May 6, 1949, for Magnetic Clutch, eventuated as Patent 2,580,869, and the United States patent application of Martin P. Winther, Serial No. 110,211, filed August 13, 1949, for Magnetic Clutch and Lining Therefor, now abandoned.

The objects of the presents invention are to provide an improved smoothly operating magnetic friction lining particularly for magnetic clutches and brakes, and an improved method and apparatus for manufacturing such linings. As to the lining itself, the improvements comprise the provision of non-grabbing facing formed in sheets having more nearly equal static and dynamic coefficients of friction and increased strength and toughness, with low magnetic reluctance to any magnetic field which may traverse the lining essentially perpendicular to its friction surfaces.

The invention accordingly comprises the elements and combinations of elements, steps and sequence of steps, features of construction and manipulation, and arrangements of parts which will be exemplified in the structures and methods hereinafter described, and the scope of the application of which will be indicated in the following claims.

In the accompanying drawing, in which one of various possible embodiments of the invention is illustrated, the single figure is a diagrammatic view illustrating certain processing apparatus and steps employed in carrying out the invention.

Briefly, the present invention comprises the construction of a reticulated or open-mesh web composed preferably of woven wire and asbestos yarn into which is worked a slurry of matrix material comprising a mixture such as of crepe rubber, litharge, barytes, zinc oxide, carbon black, graphite, sulfur and a volatile solvent such as petroleum naphtha. This material may also be similar to that previously generally used in making brake linings. But the matrix contains a large proportion of magnetic particles comprising, for example, comminuted magnetic iron particles in the form of iron powder. The matrix, magnetic particles and the solvent are thoroughly mixed to form a semisolid magnetic mixture, paste or slurry which is worked intersticially into and coated on the open-mesh web. The resulting coated web is cured to a solid condition under heat and pressure and, if orientation of the magnetic particles is desired in the matrix, it is also subjected to a magnetic field as will be shown. The web forms a support and reinforcement for the mixture both when pasty and when solid.

The materials and the proportions thereof which are used to make a batch of material from which the lining is constructed are, for example, as follows, wherein the given proportions are by weight:

Table

| Material | Preferred Percentage By Weight | Percentage Range By Weight |
|---|---|---|
| Crepe Rubber (Comminuted) | 11.0 | 10–13 |
| Litharge | 8.0 | 6– 8.5 |
| Barytes | 11.0 | 5–13 |
| Zinc Oxide | 4.0 | 3.5– 4.5 |
| Carbon Black | 2.5 | 2– 3 |
| Graphite | 3.5 | 2– 3.5 |
| Sulfur | 3.5 | 3– 4 |
| Asbestos Yarn | 9.5 | 8–10.5 |
| Wire | 11.0 | 9–13 |
| Iron Particles | 36.0 | 30–60 |
| Total | 100.0 | |

In the above table, zinc wire is preferable for the wire but other suitable metals may be used such as brass. The zinc is best because it produces the stated effect of more nearly equal static and dynamic coefficients of friction. The yarn and wire are woven together in the form of a web or mat with fairly open mesh. The asbestos yarn may be openly twisted around the wire before weaving into the mat but this twisting step may be eliminated. The iron particles may be very small such as provided by carbonyl iron powder or powdered Swedish iron. Small iron filings are also suitable. The remaining ingredients are thoroughly mixed together with a suitable thinner and solvent for the crepe rubber, in order to form a semisolid homogeneous heat-hardenable pasty or plastic mixture or slurry which is coated upon the mat, and then worked intersticially into the asbestos yarn and wire web. Application of the slurry to the mat is accomplished by smearing or troweling. The result is a damp self-supporting flexible sheet. In place of the rubber some other curable substance may be used as a binder such as a heat-hardenable synthetic resin. Examples of such resins are phenol-formaldehyde resins. The carbon black and sulfur components may be eliminated if the rubber is so replaced. In fact a satisfactory matrix may be made by adding a volatile solvent to a mixture of metal wire, uncured resin and iron particles, with or without asbestos fibre such as described in mixtures IV or V in the above mentioned application of Martin P. Winther. The volatile solvent for such resins may be any of a number of conventional solvents recommended for such resins in an uncured state. Ethyl alcohol, for example, is a suitable solvent for uncured phenol-formaldehyde resins. Petroleum naphtha, for example, will dissolve the rubber. The amount of solvent used is such as to bring the dry mixture (exclusive of the wire and yarn) to the correct pasty consistency for coating and working the mixture into the mat. For example, the percentage of solvent to dry material is from 15% to 28% by weight, with 20% to 25% preferable. The slurry-coated mat is then cured preferably for ten minutes at 350° F. under 3,000 p. s. i. Suitable ranges of these values are eight to twelve minutes; 325° F. to 400° F. and 2,500 to 3,500 p. s. i. A suitable heated press is used for the purpose, which provides a finished thickness preferably of from .035 to .045 inch. The result is a hardened intermediate sheet of increased density from which the solvents have been driven off. After this initial curing, the resulting sheet product is further cured without pressure at 400° F. for four or five hours to provide for final hardening. The range of this final curing is five to six hours at 375° F.; or three to six hours at 450° F. The above produces an improved clutch and brake lining of magnetic character having the desirable features above referred to.

As disclosed in said application of Martin P. Winther, Serial No. 110,211, the magnetic reluctance of a lining wherein particles of iron are distributed, may be improved by orienting the iron particles in string-like lines substantially normal to its faces. In order to accomplish this orientation of the iron particles in the present type of lining, another process step may be used. Thus a magnetic field may be applied to the damp yarn-wire mat, after the stated slurry mixture has been coated on and worked into it, but before the application of the compression and curing steps. It is also preferable that an additional drying step be coordinated with the magnetic orientation step. A suitable manner of accomplishing this is shown in the drawing. A strip of paper is provided such as shown at numeral 1 which is drawn across the north (N) pole 3 of an electromagnet 3, 5. The numeral 5 indicates the south (S) pole, which is spaced from the north pole 3 by a small air gap 7 of the order of ¼ inch. The electromagnet is located in a heated chamber 9, the inside temperature of which is above room temperature, and of the order of 150° F. A strong magnetic field 11 is generated in the gap 7 by exciting coils 13 of the poles. Prior to entering the chamber 9, the paper is provided with a layer of adhesive 15 for joining it with a web 17, consisting of the above described coated yarn-wire fabric. The engaged combination is drawn through the chamber 9 such that the paper slides over the pole 3. It prevents sticking. The rate of feed of the combined strip material through the chamber 9 is such that the volatile solvent is driven off and the mixture in the fabric sets, as the paper slides over the north pole 3. The field 11 orients the iron powder particles into string-like lines normal to the plane of the fabric. Orientation thus occurs before and as the slurry changes from its plastic to its solid or hardened state. Thus initially the iron particles may move to the desired oriented positions, being thereafter solidly held in such positions. The magnetic attraction holds the web against the north pole face, the paper coating permitting sliding across the pole face.

Thus the iron powder particles are perpendicularly oriented as the web loses its solvent and becomes solidified. It is to be understood, of course, that the structure illustrated in the drawing need not be in the particular vertical position shown, but that it may be turned upside down or in any desired position. As long as the strip 1 is interposed between the north pole of the electromagnet and the web, magnetic attraction of the web toward this north pole will continue to press strip 1 against the face of the north pole regardless of whether the north pole is above or below the south pole.

The next step, as the combined web leaves the chamber 9, is to cut the sheet into suitable shapes. The paper 1 may be stripped from the web 17 either before or after cutting. The oriented material is then placed in a heated press under high pressure (2,500 to 3,500 p. s. i.) at high temperature (325° F. to 400° F.) for eight to twelve minutes. If desired, a magnetic field may be maintained in the press in a direction consistent with the iron particle orientation already accomplished, but this is not absolutely necessary. In said application Serial No. 110,211, apparatus has been disclosed for providing such a field in a heated press. After the last-mentioned pressure and curing step, the material is ready for use as a magnetic brake or clutch lining or facing.

In view of the above, it will be seen that in its broad outlines the invention consists in providing a composite woven web of heat-resistant yarn and wire which forms a support for a heat-hardenable pasty magnetic mixture or matrix which will harden on drying.

The lattice of the web provides strength and toughness for the mixture and the mixture forms a matrix for holding the magnetic particles in the desired distribution. Thus is obtained a magnetic clutch and brake lining which, unlike those used heretofore for the purpose, besides having a low magnetic reluctance, is tough and strong being thoroughly reinforced throughout its volume. Moreover, it has static and sliding coefficients of friction which are more nearly of the same value than heretofore, which is an advantage in obtaining smooth action upon closure of the magnetic clutch.

In view of the above, it will be seen that the several objects of the invention are achieved and other advantageous results attained.

As many changes could be made in the above constructions and methods without departing from the scope of the invention, it is intended that all matter contained in the above description or shown in the accompanying drawing shall be interpreted as illustrative and not in a limiting sense.

I claim:

1. The method of producing magnetic clutch and brake lining comprising treating a reticulated open-mesh woven web of suitable yarn and wire by applying intersticially to the web a homogeneous hardenable plastic mixture comprising magnetic particles and a matrix therefor with a solvent to form a slurry, and passing the thus treated web through a magnetic field directed substantially normal to its surfaces while simultaneously heating the web to drive off the solvent from the slurry so as to solidify the matrix as the field orients the magnetic particles.

2. The method of producing magnetic clutch and brake lining comprising treating a reticulated open-mesh woven web of asbestos yarn and wire by applying intersticially to the web a homogeneous hardenable plastic mixture comprising magnetic particles and a matrix therefor with a solvent to form a slurry, passing the thus treated web through a magnetic field directed substantially normal to its surfaces while simultaneously heating the web to drive off the solvent from the slurry so as to solidify the matrix as the field orients the magnetic particles, and thereafter curing the thus treated web by subjecting it to further heating and to pressure.

3. A method of producing magnetic clutch and brake lining comprising treating a reticulated web of woven asbestos yarn and wire by applying intersticially to the web a slurry composed of a plastic mixture with a volatile thinner, applying a magnetic field at substantially right angles to its plane while heating above room temperature to drive off the thinner, initially curing the coated web under a pressure of 2,500 to 3,500 p. s. i. for from 8 to 12 minutes at 325° F. to 400° F., and finally curing for from 3 to 6 hours at 375° F. to 450° F., the ingredients of the resulting material comprising:

| Material: | Percentage range by weight |
|---|---|
| Rubber | 10–13 |
| Litharge | 6–8.5 |
| Barytes | 5–13 |
| Zinc oxide | 3.5–4.5 |
| Carbon black | 2–3 |
| Graphite | 2–3.5 |
| Sulfur | 3–4 |
| Asbestos yarn | 8–10.5 |
| Metallic wire | 9–13 |
| Iron particles | 30–60 |

4. A method of producing magnetic clutch and brake lining comprising applying intersticially to a woven web of suitable heatproof yarn and wire a coating of a magnetic slurry including iron particles and a matrix therefor with a suitable solvent, passing the coated web through a heated magnetic field, and curing it under heat and pressure to remove the solvent and to increase the density of the mixture.

5. A method of producing magnetic clutch and brake lining comprising applying intersticially to a continuous woven web of suitable heatproof yarn and wire a coating of a magnetic slurry including iron particles and a matrix therefor with a suitable solvent, continuously bringing the coated web into assembled engagement with a continuous protective sheet, passing the assembly through a magnetic field and thereafter curing the coated web under pressure to increase the density of the mixture.

6. Clutch and brake lining comprising a reticulated web of nonmagnetic woven wire and suitable heatproof material, a solid matrix-forming mixture interstitially positioned in and on said web, said matrix having comminuted iron distributed therethrough, the intersticial particles of comminuted iron being oriented in the matrix along lines substantially normal to the plane of the web.

References Cited in the file of this patent

UNITED STATES PATENTS

| Number | Name | Date |
|---|---|---|
| 997,498 | Headson | July 11, 1911 |
| 1,437,438 | Nanfeldt | Dec. 5, 1922 |
| 1,865,327 | McCain et al. | June 28, 1932 |
| 1,949,840 | Languepin | Mar. 6, 1934 |
| 1,969,041 | Seabury et al. | Aug. 7, 1934 |
| 2,061,919 | Nanfeldt | Nov. 24, 1936 |
| 2,096,692 | Cilley | Oct. 19, 1937 |
| 2,194,253 | Benner et al. | Mar. 19, 1940 |
| 2,196,570 | Walters | Apr. 9, 1940 |
| 2,261,847 | Dufour et al. | Nov. 4, 1941 |
| 2,264,901 | Gasling | Dev. 2, 1941 |
| 2,277,107 | Imes | Mar. 24, 1942 |
| 2,277,602 | Novak | Mar. 24, 1942 |
| 2,354,389 | Lidkea | July 25, 1944 |
| 2,418,479 | Pratt et al. | Apr. 8, 1947 |
| 2,431,883 | Morton | Dec. 2, 1947 |
| 2,605,877 | Winther | Aug. 5, 1952 |

FOREIGN PATENTS

| Number | Country | Date |
|---|---|---|
| 478,974 | Great Britain | Jan. 28, 1938 |
| 601,903 | Great Britain | May 13, 1948 |